(12) United States Patent
Gomer et al.

(10) Patent No.: US 11,960,081 B2
(45) Date of Patent: Apr. 16, 2024

(54) LAMINATED PANE COMPRISING A PHOTOPOLYMER LAYER AND PDLC ELEMENT

(71) Applicant: SAINT-GOBAIN GLASS FRANCE, Courbevoie (FR)

(72) Inventors: Andreas Gomer, Kerpen (DE); Andreas Roderburg, Aachen (DE); Huixing Zhang, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/911,086

(22) PCT Filed: Feb. 24, 2021

(86) PCT No.: PCT/EP2021/054526
§ 371 (c)(1),
(2) Date: Sep. 12, 2022

(87) PCT Pub. No.: WO2021/180471
PCT Pub. Date: Sep. 16, 2021

(65) Prior Publication Data
US 2023/0145910 A1 May 11, 2023

(30) Foreign Application Priority Data
Mar. 13, 2020 (EP) .................... 20162882

(51) Int. Cl.
*G02F 1/1334* (2006.01)
*B32B 7/02* (2019.01)
(Continued)

(52) U.S. Cl.
CPC ............ *G02B 27/0103* (2013.01); *B32B 7/02* (2013.01); *B32B 17/10* (2013.01); *B32B 25/08* (2013.01);
(Continued)

(58) Field of Classification Search
CPC ............ G02F 1/1333; G02F 1/133302; G02F 1/133305; G02F 1/133345; G02F 1/1334;
(Continued)

(56) References Cited

U.S. PATENT DOCUMENTS

2014/0176836 A1* 6/2014 Brecht ................ G02F 1/13718
349/16
2019/0101865 A1 4/2019 Popkova et al.

FOREIGN PATENT DOCUMENTS

| CN | 201359678 Y | 12/2009 |
|---|---|---|
| CN | 104303102 A | 1/2015 |

(Continued)

OTHER PUBLICATIONS

International Search Report as issued in International Patent Application No. PCT/EP2021/054526, dated Mar. 29, 2021.
(Continued)

*Primary Examiner* — Thoi V Duong
(74) *Attorney, Agent, or Firm* — Pillsbury Winthrop Shaw Pittman LLP

(57) ABSTRACT

A laminated pane, includes, in this order, an outer pane, an intermediate layer, a functional element with electrically controllable optical properties that is selected from among a PDLC functional element, a PNLC functional element, or an SPD functional element, an intermediate layer, a holographic display element, an intermediate layer, and an inner pane.

18 Claims, 1 Drawing Sheet

Figure 1:
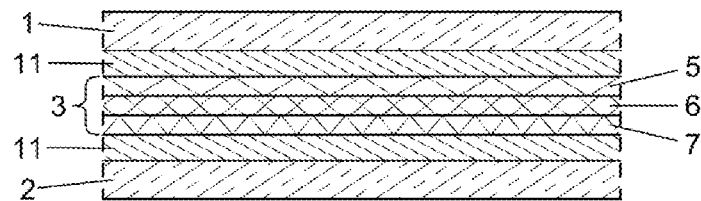

(51) Int. Cl.
*B32B 17/10* (2006.01)
*B32B 25/08* (2006.01)
*B32B 27/08* (2006.01)
*B32B 27/28* (2006.01)
*B32B 27/30* (2006.01)
*B32B 27/34* (2006.01)
*B32B 27/36* (2006.01)
*B32B 27/40* (2006.01)
*G02B 27/01* (2006.01)
*G02F 1/1333* (2006.01)
*G02F 1/1343* (2006.01)
*G03H 1/02* (2006.01)
*G02F 1/17* (2019.01)

(52) U.S. Cl.
CPC ............ *B32B 27/08* (2013.01); *B32B 27/285* (2013.01); *B32B 27/30* (2013.01); *B32B 27/306* (2013.01); *B32B 27/34* (2013.01); *B32B 27/36* (2013.01); *B32B 27/40* (2013.01); *G02F 1/1334* (2013.01); *G03H 1/0252* (2013.01); *B32B 2255/10* (2013.01); *B32B 2255/20* (2013.01); *B32B 2274/00* (2013.01); *B32B 2307/732* (2013.01); *B32B 2605/006* (2013.01); *G02F 1/133345* (2013.01); *G02F 1/1343* (2013.01); *G02F 1/172* (2013.01); *G03H 2260/12* (2013.01)

(58) Field of Classification Search
CPC ............ G02F 1/13342; G02F 1/13345; G02F 1/1335; G02F 1/1343; G02F 1/172; G02B 27/01; G02B 27/0103; G02H 1/0252; G03H 2260/12; B32B 5/02; B32B 7/02; B32B 17/00; B32B 17/10; B32B 17/10005; B32B 17/10165; B32B 17/10504; B32B 17/10532; B32B 17/10761; B32B 17/1077; B32B 17/10788; B32B 17/10036; B32B 25/08; B32B 27/00; B32B 27/06; B32B 27/08; B32B 27/285; B32B 27/30; B32B 27/306; B32B 27/308; B32B 27/34; B32B 27/36; B32B 27/40; B32B 2255/10; B32B 2255/20; B32B 2274/00; B32B 2262/04; B32B 2307/732; B32B 2323/04; B32B 2329/06; B32B 2331/04; B32B 2333/01; B32B 2367/00; B32B 2377/00; B32B 2605/006; B32B 33/00

See application file for complete search history.

(56) References Cited

FOREIGN PATENT DOCUMENTS

| | | |
|---|---|---|
| CN | 108027690 A | 5/2018 |
| CN | 109073928 A | 12/2018 |
| CN | 110023081 A | 7/2019 |
| CN | 209195228 U | 8/2019 |
| DE | 10 2017 212451 A1 | 1/2019 |
| DE | 20 2019 104803 U1 | 9/2019 |
| DE | 10 2019 108385 A1 | 10/2019 |
| JP | 2002-023107 A | 1/2002 |
| WO | WO 2018/086400 A1 | 5/2018 |
| WO | WO 2018/188844 A1 | 10/2018 |

OTHER PUBLICATIONS

First Office Action as issued in Chinese Patent Application No. 202180000953.6, dated Feb. 7, 2023.

* cited by examiner

LAMINATED PANE COMPRISING A PHOTOPOLYMER LAYER AND PDLC ELEMENT

CROSS-REFERENCE TO RELATED APPLICATIONS

This application is the U.S. National Stage of PCT/EP2021/054526, filed Feb. 24, 2021, which in turn claims priority to European patent application number 20162882.3 filed Mar. 13, 2020. The content of these applications are incorporated herein by reference in their entireties.

The invention relates to a laminated pane having functional elements with electrically controllable optical properties and holographic display elements, a method for generating visual information with the laminated pane, the use of the laminated pane, and a vehicle or a structure in which the laminated pane is installed.

Laminated panes with electrically controllable optical functional elements are known per se. The optical properties of the functional elements can be changed by an applied electrical voltage.

SPD functional elements (SPD=suspended particle device) are one example of such functional elements. The transmittance of visible light through SPD functional elements can be controlled by the applied voltage.

PDLC functional elements (PDLC=polymer dispersed liquid crystal) are another example. In this case, the active layer contains liquid crystals that are embedded in a polymer matrix.

PNLC functional elements (PNLC=polymer network liquid crystal) are another example. In this case, the active layer contains liquid crystals that are embedded in a polymer network, wherein the mode of operation is otherwise analogous to that of PDLC functional elements.

SPD, PDLC, and PNLC functional elements are commercially available as functional elements, with the active layer and the surface electrodes required for applying a voltage arranged between two carrier films.

CN 209195228 U describes the use of laminated PDLC glass as a projection screen for motor vehicles. WO 2018/86400 A1 relates to laminated PDLC glass for subway door multimedia systems.

Holographic display elements that are used as a projection surface in so-called head-up displays are also known. A head-up display is a display system with which viewers can retain their viewing direction since the visual data are projected into their field of vision. Users include, among others, pilots and automobile drivers.

US 2019/0101865 A1 describes a method for producing a laminated holographic display in which a photopolymer layer is laminated between two glass panes using polymer layers.

However, specific problems arise with the use of head-up displays. For example, the requirements for projectors that generate the images for head-up displays are high in order to provide high contrast, so relatively large volume projectors must be used which also produce a relatively large amount of heat due to high power consumption.

In addition, it is difficult to protect user privacy with head-up displays since the projection surfaces used are transparent from both sides. Moreover, pedestrian safety must be ensured by avoiding blinding glare.

The object of the invention consists in meeting the high requirements for contrast of images that are generated on or behind glass with reduced demands on the projector. In addition, user privacy should also be better protected.

The object of the present invention is accomplished by a laminated pane in accordance with independent claim 1. The invention also relates to a method for generating visual information using the laminated pane, to the use of the laminated pane, and to the laminated panes according to the invention that are mounted in structures or vehicles, in accordance with the other independent claims. Preferred embodiments are apparent from the dependent claims.

The invention presented solves the problem of the high requirements for contrast of images that are generated on or behind the glass by using the holography principle in combination with specific functional elements, in particular with PDLCs, which can be used to control the optical properties of the pane.

As a result, higher contrast is achieved for the image generated, in particular, when the transparency of the laminated pane is reduced with the help of the functional element. The projector power required is thus drastically reduced, which can also result in a reduction in the size of the projector and thus enables use in a limited space, for example, in cars. Since a smaller amount of light is required, less heat is also generated.

In addition, the invention enables privacy protection for the users of holographic image displays. By adjusting the optical properties of the pane by means of the functional element, in particular PDLC, pedestrians outside the vehicle cannot see the images displayed on the glass. And finally, the combination of PDLC and holographic film avoids pedestrian blinding from glare that can be caused by the transmitted laser or light beams of the hologram.

This invention is a combination of a PDLC film and a holographic film that are laminated in glass. The combination of the two material stacks enables a privacy function for display applications based on the holography principle when the PDLC layer is activated and thus the amount of transmitted light is reduced. This helps to use diffuse reflections of the holographic material for applications such as transparent screens that are not visible to people outside the car. In addition, a switchable background, such as the PDLC, increases the contrast of the image generated by the hologram. This contributes to the fact that the requirements on the projector can be reduced and/or the visible area can be increased.

The laminated pane according to the invention is suitable for use as a projection surface for head-up displays (HUD).

The invention is explained in greater detail in the following. The following statements are made with respect to the laminated pane according to the invention or the method according to the invention or the use according to the invention or the vehicles or structures according to the invention but do also always apply to the laminated pane itself, the method, the use, and the vehicles or structures in which the laminated pane is installed, unless expressly stated otherwise.

According to the invention, a laminated pane is provided that comprises, in this order: an outer pane 1, an intermediate layer 11, a functional element 4 with electrically controllable optical properties, which is selected from among a functional element, a PNLC functional element, or an SPD functional element, an intermediate layer 11, a holographic display element 3, an intermediate layer 11, and an inner pane 2.

The laminated pane comprises an inner pane and an outer pane. The inner pane and the outer pane can be flat or curved panes. The panes can be made of inorganic glass and/or organic glass (plastic). The inner pane and the outer pane can, for example, independently of one another, be made of flat glass, quartz glass, borosilicate glass, soda lime glass, aluminosilicate glass, polycarbonate, and/or polymethacrylate. The inner pane and the outer pane are preferably made of soda lime glass. The inner pane and the outer pane have, for example, independently of one another, a thickness in the range from 0.4 to 5.0 mm, e.g., 1 to 3 mm, preferably 1.6 to 2.5 mm.

The inner pane and/or the outer pane can have other suitable coatings known per se, e.g., nonstick coatings, tinted coatings, antireflective coatings, anti-scratch coatings, or low-E coatings. The inner pane and the outer pane can be colored or colorless (white). In one embodiment, the outer pane is, for example, a green pane. The inner pane is, for example, a white pane, i.e., a colorless pane.

The functional element and the holographic display element are flat bodies, which can also be referred to as the functional layer and the holographic display layer, respectively. The polymeric layers contained in the laminated pane are usually formed by films. The terms layers and films are used interchangeably.

The laminated pane according to the invention includes a functional element with electrically controllable optical properties selected from among a PDLC functional element, a PNLC functional element, or an SPD functional element. In a preferred embodiment, the functional element with electrically controllable optical properties is a PDLC functional element.

Such functional elements and their mode of operation are known per se to the person skilled in the art. By means of the functional element, in particular the PDLC functional element, the light transmittance of the laminated pane can be reduced as required, thus achieving a privacy protection effect and increasing the contrast for visual information.

The functional element, in particular the PDLC functional element, generally comprises, in this order, a carrier layer, a surface electrode, an active layer, a surface electrode, and a carrier layer.

The active layer has variable optical properties that can be controlled by an electrical voltage applied to the active layer. In the context of the invention, "electrically controllable optical properties" means, in particular, those properties that are continuously controllable, but equally also those that can be switched between two or more discrete states. Said optical properties relate in particular to light transmittance and/or scattering behavior.

The active layer of a PDLC functional element contains liquid crystals that are embedded in a polymer matrix. If no voltage is applied on the surface electrodes, the liquid crystals are aligned in a disorderly manner, resulting in strong scattering of the light passing through the active layer. If voltage is applied on the surface electrodes, the liquid crystals align themselves in a common direction and the transmittance of light through the active layer is increased.

The active layer of PNLC functional element contains liquid crystals that are embedded in a polymer network. Otherwise, the functional principle is similar to that of the PDLC functional element. The active layer of an SPD functional element contains suspended particles, whereby the absorption of light by the active layer can be changed by applying a voltage on the surface electrodes.

The functional element includes surface electrodes for applying voltage on the active layer that are arranged between the carrier layers and the active layer. One surface electrode is arranged between the active layer and one carrier layer, and one surface electrode is arranged between the active layer and the other carrier layer. The surface electrodes can be the same or different in terms of composition and/or thickness. The surface electrodes are usually the same.

The surface electrodes are preferably designed as transparent, electrically conductive layers. The surface electrodes preferably contain at least one metal, a metal alloy, or a transparent conducting oxide (TCO). Examples of transparent conducting oxides (TCOs) include indium oxide doped with tin (ITO, also referred to as indium tin oxide), tin oxide doped with antimony or fluorine ($SnO_2$:F), zinc oxide doped with gallium or zinc oxide doped with aluminum (ZnO:Al), with ITO being preferred. The thickness of the electrically conducting layers based on these transparent conducting oxides (TCO) is preferably in the range from 10 nm to 2 µm, more preferably 30 nm to 500 nm, and in particular 30 nm to 400 nm.

The electrically conductive layer can also be a metal layer, preferably a thin layer or a stack of thin foils that comprise metal layers. Here, metal also includes metal alloys. Suitable metals are, for example, Al, Pd, Cu, Pd, Pt, In, Mo, Au, Ni, Cr, W, or alloys thereof. These metal coatings are referred to as TCCs (transparent conductive coatings). Typical thicknesses of the individual layers are in the range from 2 to 50 nm.

Typically, the surface electrodes are implemented in the form of an electrically conductive coating on the carrier film or carrier layer. The surface electrodes preferably have a thickness in the range from 30 to 400 nm.

The functional elements further include two carrier layers or carrier films (a first carrier layer and a second carrier layer). The carrier layers are formed in particular from polymeric or thermoplastic films. The carrier layers can be the same or different in terms of composition and/or thickness. Typically, the two carrier layers have the same composition.

In particular, the carrier layers contain or are made of a thermoplastic material. The thermoplastic material can be a thermoplastic polymer or a mixture of two or more thermoplastic polymers. In addition to the thermoplastic material, the carrier layer can also include additives, such as plasticizers. The thermoplastic material of the carrier layers is preferably polyethylene terephthalate (PET), as is customary in commercially available functional elements. Consequently, the carrier layers are preferably formed from PET film.

The thermoplastic material of the carrier layer can also contain or be made of mixtures of PET with other thermoplastic polymers and/or copolymers of PET. The thermoplastic material of the carrier film can, for example, also contain or be made of PU, polypropylene, polycarbonate, polymethyl methacrylate, polyacrylate, polyvinyl chloride, polyacetate resin, fluorinated ethylene propylenes, polyvinyl fluoride, and/or ethylene tetrafluoroethylene.

The thickness of each carrier layer is, for example, in the range from 0.03 mm to 0.4 mm, preferably from 0.04 mm to 0.2 mm. The thickness of the carrier layers is preferably in the range from 100 to 200 µm.

In a preferred embodiment, in the functional element, preferably in the PDLC functional element, the carrier layers are formed from PET film, and/or the surface electrodes are formed from ITO layers.

In a preferred embodiment, in the functional element, preferably in the PDLC functional element, the carrier layers have, independently in each case, a thickness in the range from 100 to 200 µm; the surface electrodes, independently in each case, a thickness in the range from 30 to 400 nm; and/or the active layer, a thickness in the range from 10 to 30 µm.

The laminated pane according to the invention further includes a holographic display element. Such holographic display elements and their mode of operation are known per se to the person skilled in the art. For example, Bayfol® HX from Covestro can be used for the holographic display element. A holographic display element is designed to display a hologram that can be seen by the viewer. For recording, the photopolymer layer of the holographic display element with an imaging unit, also referred to as a projector, is exposed, providing a hologram as visual information in the photopolymer layer.

The holographic display element includes a photopolymer layer that is arranged between a cover layer and a substrate layer.

The photopolymer layer contains photopolymers or holographic photopolymers. Photopolymers are generally materials that react with a chemical reaction when exposed to light. Holographic photopolymers record an interference pattern and thus show the chemical formation of diffraction gratings. They can be formed, for example, from a cross-linked matrix system with imaging components incorporated therein. Often, polyacrylate compounds are contained in such photopolymer layers.

The substrate layer of the holographic display element can, for example, be formed from polyamide (PA) film or cellulose triacetate (TAC) film. The cover layer of the holographic display element can, for example, be formed from polyamide (PA) film, cellulose triacetate (TAC) film, polymethyl methacrylate (PMMA) film, or polyethylene terephthalate (PET) film.

The holographic display element can expediently be arranged in the laminated pane such that the substrate layer is arranged between the inner pane and the photopolymer layer. However, it is also possible for the holographic display element to be arranged such that the cover layer is arranged between the inner pane and the photopolymer layer.

However, care must be taken that no birefringent layer be arranged between the inner pane and the photopolymer layer. For example, PMMA is a birefringent material. If a birefringent material such as PMMA is used for the cover layer, then the cover layer cannot be arranged between the inner pane and the photopolymer layer.

In the holographic display element, the substrate layer can, for example, have a thickness in the range from 50 to 200 µm. The photopolymer layer can, for example, have a thickness in the range from 10 to 80 µm. The cover layer can, for example, have a thickness in the range from 50 to 250 µm.

The laminated pane according to the invention further includes three intermediate layers. More intermediate layers can also be included. The intermediate layers can be the same or different in terms of composition and/or thickness. The intermediate layers can be formed by commercially available laminating films. They are used to bond or laminate the components of the laminated pane. The intermediate layers bond the inner pane and the outer pane to one another and laminate the functional element and the holographic display element into the glass.

The intermediate layers are formed in particular from polymeric films, usually thermoplastic films. The intermediate layer can, for example, contain polyvinyl butyral (PVB), ethylene vinyl acetate, polyurethane, polypropylene, polyacrylate, polyethylene, polycarbonate, polymethyl methacrylate, polyvinyl chloride, polyacetate resin, casting resin, acrylate, fluorinated ethylene propylene, polyvinyl fluoride, and/or ethylene tetrafluoroethylene and/or a mixture and/or a copolymer thereof.

In a preferred embodiment, the intermediate layers are formed, independently in each case, from polyvinyl butyral (PVB) film, thermoplastic polyurethane (TPU) film, ethylene vinyl acetate copolymer (EVA) film, OCA film, or a combination thereof. In a preferred embodiment, the intermediate layers are formed from PVB films. OCA is the abbreviation for "optical clear adhesive" and refers to a double-sided adhesive tape. OCA can either be supplied in the form of films and laminated directly or, on the other hand, initially be in a liquid state, wherein they are first coated and activated to cure and bond, e.g., with UV radiation, chemical substances, and/or heat.

The at least two films for forming the intermediate layers preferably have, independently in each case, a thickness in the range from 0.03 mm to 0.9 mm, particularly preferably 200 to 800 µm, preferably being PVB films.

The invention further relates to a method for generating visual information with a head-up display, comprising generating an image with an imaging unit, and directing the image onto a laminated pane according to the invention as described above as a projection surface, wherein the visual information is viewed from the space facing the side of the inner pane.

By adjusting the transparency using the functional element, in particular the PDLC functional element, the amount of transmitted light can be reduced as required. This enables better contrast in the visual information on the one hand and better privacy protection on the other.

Head-up displays are known to the person skilled in the art and generally comprise an imaging unit and a projection surface. The imaging unit generates the image and can further comprise an optics module, e.g., mirror optics, that deflects the image onto the projection surface.

The imaging unit includes an illumination device that can, for example, be one or more illumination elements selected from among incandescent lamps, gas discharge lamps, light emitting diodes, and/or laser light sources. Accordingly, visible light or laser light can be used for the exposure.

The visual information is viewed from the space that faces the inner pane of the laminated pane. This is usually an interior space in which the viewer is situated, e.g., a vehicle interior.

In the method according to the invention, the laminated pane can be mounted in a vehicle or in a structure.

The invention further relates to the use of the laminated pane according to the invention as described above as a projection surface for a head-up display. In use, the laminated pane is suitably mounted in a vehicle or in a structure.

The laminated pane according to the invention as described above is preferably mounted in a vehicle or in a structure. The laminated pane is mounted on the vehicle or structure such that the inner pane faces the interior. The interior is the space in which the viewer is situated when viewing the video information displayed by the laminated pane.

Consequently, the invention also relates to a vehicle or a structure in which a laminated pane according to the invention is mounted as described above.

In a preferred embodiment, the vehicle or structure is a vehicle selected from among motor vehicles, such as passenger cars, or transport vehicles, such as buses, trains, aircraft, or watercraft.

In a preferred embodiment, the vehicle or structure is a structure, wherein the laminated pane is mounted as a window pane or a separating pane. The separating pane can serve as a partition or a display device.

In a preferred embodiment, the laminated pane is a rear window, side window, windshield, or roof panel of a motor vehicle, in particular of a passenger car.

Generally, a head-up display that includes an imaging unit, wherein the laminated pane serves as a projection surface of the head-up display, is mounted in the vehicle or structure according to the invention.

The invention is explained in greater detail below using exemplary embodiments with reference to the accompanying figures, which are in no way intended to restrict the invention. The accompanying figures are schematic representations and not-to-scale.

Figure 2:
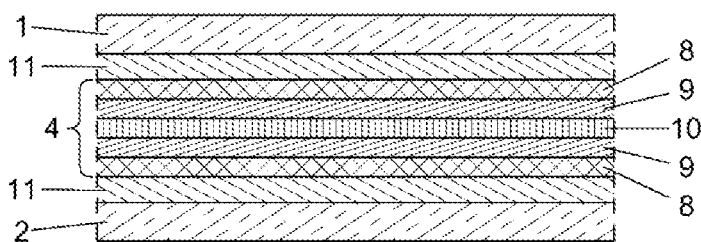
Figure 3:
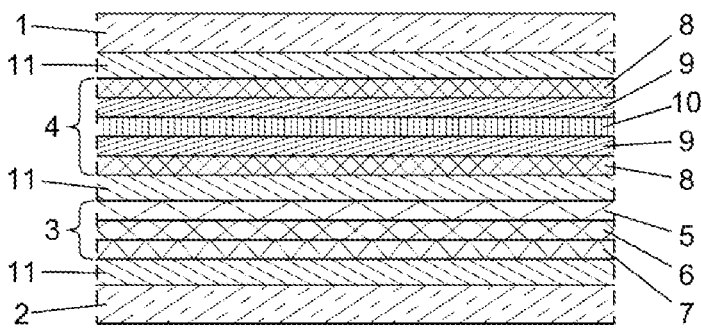

They Depict:

FIG. 1 a detail of a prior art laminated pane with a holographic display element in cross-section, FIG. 2 a detail of a prior art laminated pane with a PDLC functional element in cross-section, FIG. 3 a detail of a laminated pane according to the invention in cross-section.

FIG. 1 depicts a prior art laminated pane with a holographic display element 3 in cross-section. The laminated pane comprises an outer pane 1 and an inner pane 2, between which a holographic display element 3 is laminated. The holographic display element 3 is formed, in this order, from a cover layer 5, a photopolymer layer 6, and a substrate layer 7.

The substrate layer 7 is formed, for example, from PA film or TAC film. The cover layer 5 is formed, for example, from PA film, TAC film, PMMA film, or PET film. The substrate layer 7 has a thickness in the range from 50 to 200 µm. The photopolymer layer 6 has a thickness in the range from 10 to 80 µm. The cover layer 5 has a thickness in the range from 50 to 250 µm.

An intermediate layer 11 that bonds or joins the panes is arranged in each case between the outer pane 1 and the holographic display element 3 and between the inner pane 2 and the holographic display element 3. The intermediate layers are preferably PVB films that have, for example, a thickness in the range from 200 to 800 µm.

FIG. 2 depicts a prior art laminated pane with electrically controllable optical properties in cross-section. The laminated pane comprises an outer pane 1 and an inner pane 2, between which a PDLC functional element 4 is laminated. The PDLC functional element is formed, in this order, from a carrier layer 8, a surface electrode 9, an active PDLC layer 10, a surface electrode 9, and a carrier layer 8.

The carrier layers 8 are formed from PET films and have, for example, a thickness in the range from 100 to 200 µm. The surface electrodes 9 are formed from ITO and have, for example, a thickness in the range from 30 to 400 nm. The active layer 10 has, for example, a thickness in the range from 10 to 30 µm.

An intermediate layer 11 that bonds or joins the panes is arranged in each case between the outer pane 1 and the PDLC element 4 and between the inner pane 2 and the PDLC element 4. The intermediate layers are preferably PVB films that have, for example, a thickness in the range from 200 to 800 µm.

FIG. 3 depicts, in cross-section, a detail of a laminated pane according to the invention that has a combination of PDLC film and holographic film in glass. The laminated pane is suitable as a projection surface for a holographic head-up display (HUD). The laminated pane can be used, for example, as a windshield of an automobile.

The laminated pane according to the invention comprises, in this order, an outer pane 1, an intermediate layer 11, a PDLC functional element 4 with electrically controllable optical properties, an intermediate layer 11, a holographic display element 3, an intermediate layer 11 and an inner pane 2. In one embodiment, the outer pane 1 is green and the inner pane 2 is white. Both panes 1 and 2 are transparent.

The PDLC functional element 4 is formed, in this order, from a carrier layer 8, a surface electrode 9, an active PDLC layer 10, a surface electrode 9, and a carrier layer 8. The carrier layers 8 are formed from PET films and have, for example, a thickness in the range from 100 to 200 µm. The surface electrodes 9 are formed from ITO and have, for example, a thickness in the range from 30 to 400 nm. The active layer 10 has, for example, a thickness in the range from 10 to 30 µm.

The holographic display element 3 is formed from, in this order, a cover layer 5, a photopolymer layer 6, and a substrate layer 7. The substrate layer 7 is formed, for example, from PA film or TAC film. The cover layer 5 is formed, for example, from PA film, TAC film, PMMA film, or PET film. The substrate layer 7 has a thickness in the range from 50 to 200 µm. The photopolymer layer 6 has a thickness in the range from 10 to 80 µm. The cover layer 5 has a thickness in the range from 50 to 250 µm.

An intermediate layer 11 that bonds or joins the panes and the elements 3 and 4 is arranged in each case between the outer pane 1 and the PDLC element 4, between the inner pane 2 and the holographic display element 3, and between the PDLC element 4 and the holographic display element 3. The intermediate layers are preferably PVB films, that have, for example, a thickness in the range from 200 to 800 µm.

LIST OF REFERENCE CHARACTERS 1 outer pane
2 inner pane
3 holographic display element
4 functional element with electrically adjustable optical properties, e.g., PDLC
5 cover layer of the holographic display element
6 photopolymer layer of the holographic display element
7 substrate layer of the holographic display element
8 carrier layer of the functional element
9 surface electrode of the functional element
10 active layer of the functional element
11 intermediate layer

The invention claimed is:

1. A laminated pane, comprising, in this order,
an outer pane,
a first intermediate layer,
a functional element with electrically controllable optical properties that is selected from among a PDLC functional element, a PNLC functional element, or an SPD functional element,
a second intermediate layer,
a holographic display element,
a third intermediate layer), and
an inner pane.

2. The laminated pane according to claim 1, wherein the holographic display element comprises, in this order, a cover layer, a photopolymer layer, and a substrate layer.

3. The laminated pane according to claim 2, wherein the functional element comprises, in this order, a first carrier layer, a first surface electrode, an active layer, a second surface electrode, and a second carrier layer.

4. The laminated pane according to claim 3, wherein
in the holographic display element, the substrate layer has a thickness in the range from 50 to 200 μm, the photopolymer layer has a thickness in the range from 10 to 80 μm, or the cover layer has a thickness in the range from 50 to 250 μm, or both, or
in the functional element, the first and second carrier layers have, independently in each case, a thickness in the range from 100 to 200 μm, the first and second surface electrodes have, independently in each case, a thickness in the range from 30 to 400 nm, or the active layer has a thickness in the range from 10 to 30 μm, or both, or
the first, second and third intermediate layers have, independently in each case, a thickness in the range from 200 to 800 μm.

5. The laminated pane according to claim 3, wherein in the functional element, the first and second carrier layers are formed from polyethylene terephthalate (PET) film, or the first and second surface electrodes are formed from ITO layers, or both.

6. The laminated pane according to claim 5, wherein in the functional element is the PDLC functional element.

7. The laminated pane according to claim 2, wherein
the substrate layer of the holographic display element is formed from polyamide (PA) film or cellulose triacetate (TAC) film, or
the cover layer of the holographic display element is formed from polyamide (PA) film, cellulose triacetate (TAC) film, polymethyl methacrylate (PMMA) film, or polyethylene terephthalate (PET) film,
or both.

8. The laminated pane according to claim 1, wherein the functional element is a PDLC functional element.

9. The laminated pane according to claim 1, wherein
the first, second and third intermediate layers are formed from polyvinyl butyral (PVB) film, thermoplastic polyurethane (TPU) film, ethylene vinyl acetate copolymer (EVA) film, OCA film, or a combination thereof.

10. A method for generating visual information with a head-up display, comprising generating an image with an imaging unit, and directing the image onto a laminated pane according to claim 1 as a projection surface, wherein the visual information is viewed from a space that faces a side of the inner pane.

11. The method according to claim 10, wherein the laminated pane is mounted in a vehicle or a structure.

12. A method comprising forming a projection surface for a head-up display with the laminated pane according to claim 1.

13. The method according to claim 12, wherein the laminated pane is mounted in a vehicle or in a structure.

14. A vehicle or structure, in which a laminated pane according to claim 1 is mounted.

15. The vehicle or structure according to claim 14,
that is the vehicle selected from among a motor vehicle or a transport vehicle, or
that is the structure wherein the laminated pane is mounted as a window pane or a separating pane.

16. The vehicle or structure according to claim 15, wherein the motor vehicle is a passenger car and the transport vehicle is a bus, a train an aircraft, or a watercraft.

17. The vehicle or structure according to claim 14, wherein the laminated pane is a rear window, side window, windshield or roof panel of a vehicle.

18. The vehicle or structure according to claim 14, in which a head-up display is mounted that comprises an imaging unit, wherein the laminated pane serves as a projection surface of the head-up display.

* * * * *